Figure 3:
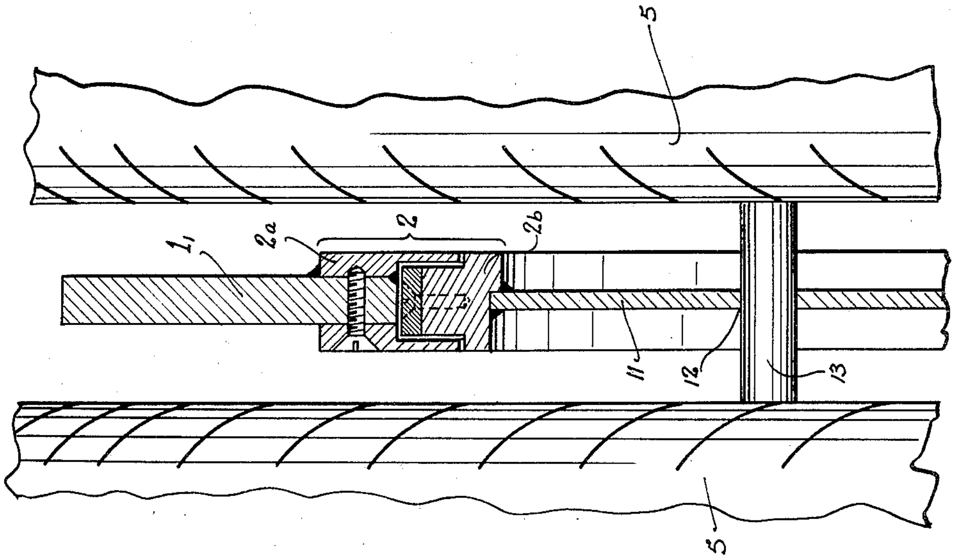

Feb. 18, 1958 G. O. A. DAHLSTROM 2,823,928
DEVICE FOR REMOVING FOREIGN BODIES FROM BETWEEN TWIN TIRES
Filed Aug. 10, 1956 2 Sheets-Sheet 1
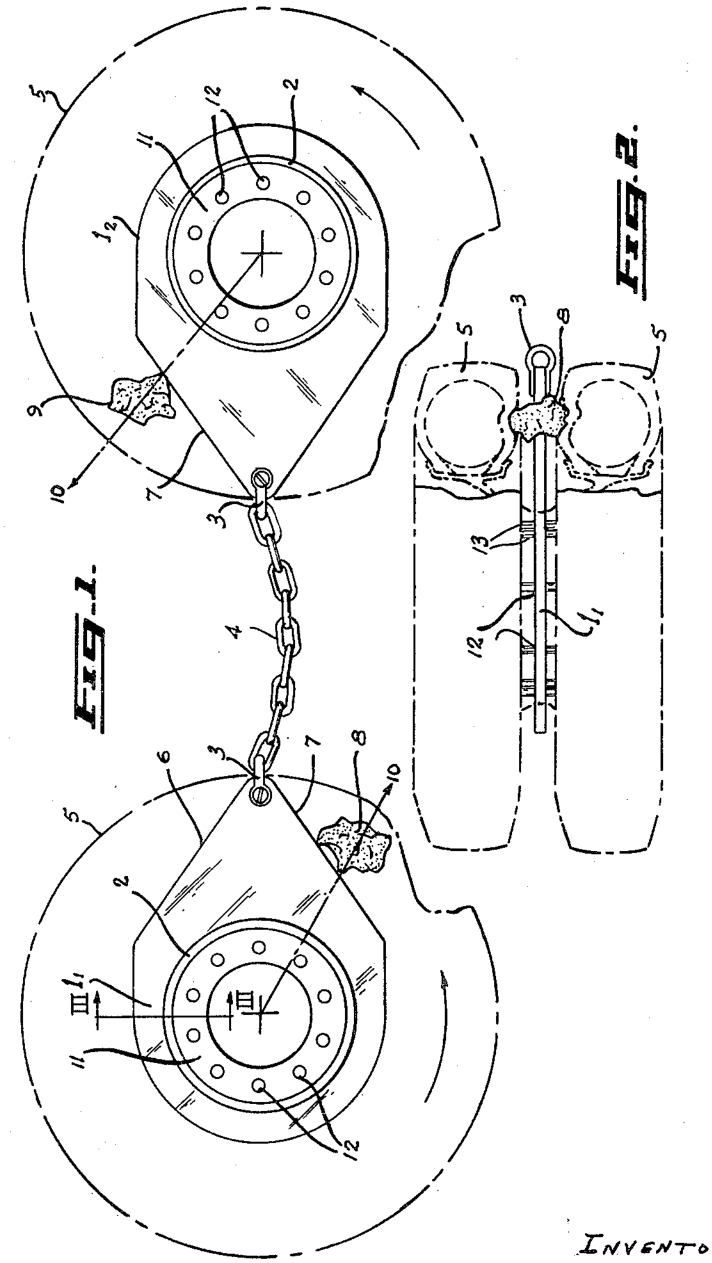
INVENTOR
Gottfrid O. A. Dahlstrom
ATTORNEYS
Stevens, Davis, Miller & Mosher Feb. 18, 1958 G. O. A. DAHLSTROM 2,823,928

DEVICE FOR REMOVING FOREIGN BODIES FROM BETWEEN TWIN TIRES

Filed Aug. 10, 1956 2 Sheets-Sheet 2

Inventor
Gottfried Otto Alexander Dahlstrom
by Stevens Davis Miller & Mosher
his attorneys United States Patent Office 2,823,928
Patented Feb. 18, 1958

1

2,823,928

DEVICE FOR REMOVING FOREIGN BODIES FROM BETWEEN TWIN TIRES

Gottfrid Otto Alexander Dahlstrom, Vancouver, British Columbia, Canada

Application August 10, 1956, Serial No. 603,337

Claims priority, application Canada August 15, 1955

4 Claims. (Cl. 280—158)

This invention relates to a device for removing foreign bodies, more particularly rocks, that become lodged between twin tires as used on road vehicles, especially tractors and heavy vehicles such as trucks.

Experience has shown that a very appreciable proportion of the wear experienced by twin tires is caused by rocks becoming lodged between the opposed walls of the two tires, and the object of the present invention is the provision of a convenient and cheaply manufactured device for protecting tires from this danger.

According to the invention broadly, the device to be employed in combination with a pair of twin vehicle wheels (i. e. closely-spaced, coaxially mounted wheels) having tires thereon comprises a generally flat plate freely-rotatably mounted betwen said wheels coaxially therewith and means for holding said plate against rotation with said wheels, said plate including a pair of edge surfaces each extending non-radially outwardly from a point approximately in register with the inner peripheries of the tires to a point approximately in register with the outer peripheries of the tires generally in that direction of rotation of the wheels in which such edge surface will be the first of said edge surfaces encountered by a section of the tires moving away from their point of contact with the road surface.

In a more specific form, the device comprises bearing means mounted on a member adapted for securing between said wheels for rotation therewith, said bearing means being coaxial with said wheels, a generally flat plate mounted on said bearing means by means of a generally circular boss portion of diameter not greater than approximately that of the inner peripheries of the tires, said plate also having a triangular portion extending away from said poss portion by an amount approximately equal to the depth of said tires, and means secured to the apex of said triangular portion for attachment to a fixed part of the vehicle frame or to the apex of the triangular portion of a like device mounted between the tires of a second pair of closely spaced coaxially-mounted wheels of the vehicle.

The accompanying drawing illustrates one embodiment of the invention, by way of example.

Figure 1 shows a side view of two sets of twin tires arranged closely in front of one another, the outer tire of each pair having been removed to reveal a device according to the invention positioned between the tires of each pair; and Figure 2 is an underneath plan view of the left hand of one of such pairs of twin tires seen in Figure 1, this view being partly cut away whereby more clearly to demonstrate the performance of the device according to the invention.

Figure 3 is an enlarged section taken on the line III—III in Figure 1.

Mounted on bearings 2 between each pair of wheels so as to be coaxial therewith, is a flat plate $1_1$ or $1_2$, each such plate having a projecting portion that extends approximately into register with the outer peripheries of the tires 5 on such wheels and carries a shackle 3 whereby the plate is secured to the end link of a chain 4. As appears from Figure 1, the chain 4 extends with some slack (to permit a degree of relative movement between the two pairs of wheels) between the shackles 3 of the two plates $1_1$ and $1_2$ on adjacent sets of twin tires 5. If only one set of twin tires is present on the vehicle, then the end of the chain 4 not secured to the plate $1_1$ will be connected to a fixed part of the vehicle frame.

The plates $1_1$ and $1_2$ are so shaped as to have inclined edge surfaces 7 extending in register with the tires 5 so that, as the wheels rotate (anti-clockwise in the example), a rock 8 or 9 that has become pinched between the opposed side walls of the tires will be forced radially outwardly by such surface 7 in a direction, relative to the tires, diagrammatically indicated by the arrows 10. Removal of the foreign body in a truly radial direction is desirable, since this represents the reverse movement to that which it carried out on entering the space between the tires, and the possibility of inflicting further damage to the tires is thus minimised. It is also necessary to have similarly inclined edge faces 6 on the other sides of the plates $1_1$ and $1_2$ to provide for removal of foreign bodies in the reverse direction of travel of the vehicle. It is desirable to have the plates symmetrical and thus susceptible to mounting between the wheels without the need for special care as to positioning.

As best seen in Figure 3, each of the bearings 2 consists of two parts, *2a* and *2b*. The outer part *2a* of each bearing 2 is secured to a respective plate $1_1$ or $1_2$. The inner part *2b* of each bearing 2 is secured to the corresponding disc 11. Each disc 11 has a series of holes 12 for receiving bolts 13 that extend between the two wheels. To mount the plate $1_1$ or $1_2$, the outer vehicle wheel 5 is removed, the disc 11 with the plate $1_1$ or $1_2$ mounted on it by means of the bearing 2 is lined up with the bolts 13 and slipped onto these bolts. The outside wheel is repositioned and secured in place on such bolts by suitable nuts. The inside portion *2b* of each bearing 2 then turns solidly with its associated wheels, while the plate $1_1$ or $1_2$ which is secured to the outer portion *2a* of the bearing 2 is prevented from turning by the chain 4.

I claim:

1. For use wtih a pair of closely-spaced coaxially-mounted vehicle wheels having tires thereon, a device for removing foreign bodies from between the opposed side walls of said tires, said device comprising bearing means mounted on a member adapted for securing between said wheels for rotation therewith, said bearing means being coaxial with said wheels, a generally flat plate mounted on said bearing means by means of a generally circular boss portion of diameter not greater than approximately that of the inner peripheries of the tires, said plate also having a triangular portion extending away from said boss portion by an amount approximately equal to the depth of said tires, and means secured to the apex of said triangular portion for attachment to a fixed part of the vehicle frame or to the apex of the triangular portion of a like device mounted between the tires of a second pair of closely spaced coaxially-mounted wheels of the vehicle.

2. The combination in a vehicle of a first pair of closely-spaced coaxially mounted road wheels having tires thereon, a second pair of similar closely-spaced coaxially mounted road wheels having tires thereon, said second pair of wheels being spaced rearwardly from said first pair and aligned therewith, a first device for removing foreign bodies from between opposed side walls of said first pair, a second device for removing foreign bodies from between the opposed side walls of said second pair, each of said devices comprising a generally flat plate freely-rotatably mounted between said wheels coaxially therewith, each said plate including a pair of edge surfaces each extending non-radially outwardly from a point approximately in register with the inner peripheries of the tires to a point approximately in register with the outer peripheries of the tires generally in that direction of rotation of the wheels in which such edge surface will be the first of said edge surfaces encountered by a section of the tires moving away from their point of contact with the road surface, and means for holding both plates against rotation with the wheels, said last-mentioned means comprising a positive connection between a portion of one said plate and a portion of the other said plate.

3. The combination of claim 2 wherein said connection comprises a chain arranged with a small amount of slack whereby to permit relative movement between each said pair of wheels.

4. The combination of claim 2, wherein each of said plates comprises a generally circular boss portion carrying bearing means, the inner portion of which is secured between the wheels to rotate therewith, and a generally triangular portion extending radially outwardly therefrom, the sides of such triangle forming said edge surfaces, and the apex of said triangle providing a point of attachment for said means for holding the plate against rotation with the wheels.

References Cited in the file of this patent

UNITED STATES PATENTS

| | | |
|---|---|---|
| 851,055 | Beskow | Apr. 23, 1907 |
| 2,356,292 | Wildman | Aug. 22, 1944 |
| 2,771,304 | La Pere | Nov. 20, 1956 |